(12) United States Patent
Oygard et al.

(10) Patent No.: US 11,372,691 B2
(45) Date of Patent: Jun. 28, 2022

(54) DATA PROCESSING SYSTEMS COMPRISING GROUPED EXECUTION THREADS WITH COMMON DATA VALUES

(71) Applicant: Arm Limited, Cambridge (GB)

(72) Inventors: Tord Kvestad Oygard, Troms og Finmark (NO); Samuel Martin, Waterbeach (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/931,770

(22) Filed: Jul. 17, 2020

(65) Prior Publication Data

US 2022/0019486 A1    Jan. 20, 2022

(51) Int. Cl.
*G06F 9/46* (2006.01)
*G06F 9/52* (2006.01)
*G06F 9/50* (2006.01)

(52) U.S. Cl.
CPC ............... *G06F 9/52* (2013.01); *G06F 9/505* (2013.01)

(58) Field of Classification Search
CPC ....................................................... G06F 9/52
See application file for complete search history.

*Primary Examiner* — Gregory A Kessler
(74) *Attorney, Agent, or Firm* — Vierra Magen Marcus LLP

(57) ABSTRACT

In a data processor that executes programs to perform data processing operations for groups of execution threads, when the threads of a thread group are all to process a same, common input data value, different portions of the common input data value are loaded into respective registers of different threads of the group of threads, such that the common input data value is stored in a distributed fashion across registers of plural different threads of the thread group. Then, when the threads of the thread group are to process a portion the common input data value, the portion is provided from the thread that stores it to all the threads in the thread group.

21 Claims, 9 Drawing Sheets

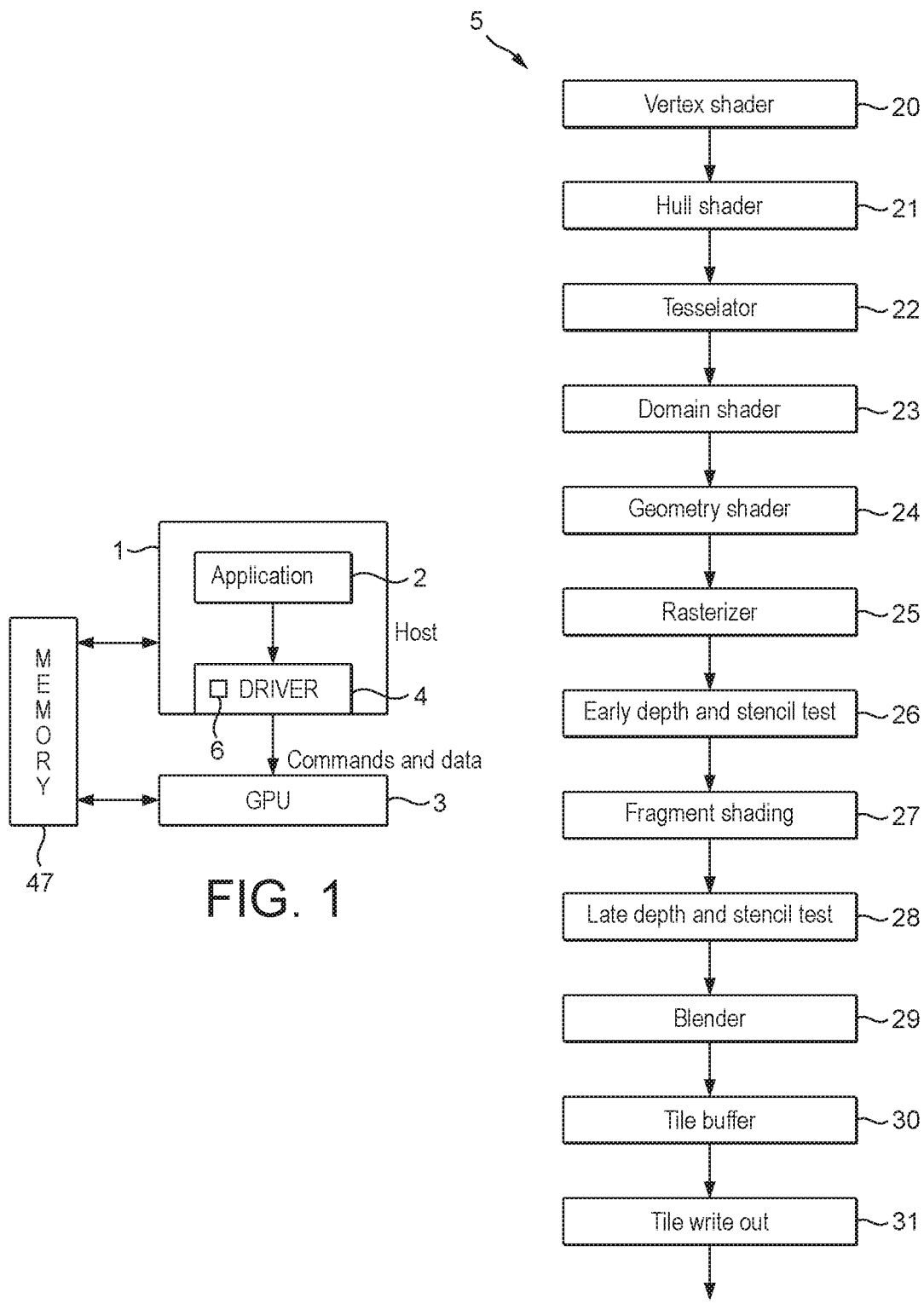

| | Thread 0 | Thread 1 | Thread 2 | Thread 3 | Thread 4 | Thread 5 | Thread 6 | Thread 7 | Thread 8 | Thread 9 | Thread 10 | Thread 11 | Thread 12 | Thread 13 | Thread 14 | Thread 15 |
|---|---|---|---|---|---|---|---|---|---|---|---|---|---|---|---|---|
| Register N+0 | Base + 0 | Base + 0 | Base + 0 | Base + 0 | Base + 0 | Base + 0 | Base + 0 | Base + 0 | Base + 0 | Base + 0 | Base + 0 | Base + 0 | Base + 0 | Base + 0 | Base + 0 | Base + 0 |
| Register N+1 | Base + 4 | Base + 4 | Base + 4 | Base + 4 | Base + 4 | Base + 4 | Base + 4 | Base + 4 | Base + 4 | Base + 4 | Base + 4 | Base + 4 | Base + 4 | Base + 4 | Base + 4 | Base + 4 |
| Register N+2 | Base + 8 | Base + 8 | Base + 8 | Base + 8 | Base + 8 | Base + 8 | Base + 8 | Base + 8 | Base + 8 | Base + 8 | Base + 8 | Base + 8 | Base + 8 | Base + 8 | Base + 8 | Base + 8 |
| Register N+3 | Base + 12 | Base + 12 | Base + 12 | Base + 12 | Base + 12 | Base + 12 | Base + 12 | Base + 12 | Base + 12 | Base + 12 | Base + 12 | Base + 12 | Base + 12 | Base + 12 | Base + 12 | Base + 12 |
| Register N+4 | Base + 16 | Base + 16 | Base + 16 | Base + 16 | Base + 16 | Base + 16 | Base + 16 | Base + 16 | Base + 16 | Base + 16 | Base + 16 | Base + 16 | Base + 16 | Base + 16 | Base + 16 | Base + 16 |
| Register N+5 | Base + 20 | Base + 20 | Base + 20 | Base + 20 | Base + 20 | Base + 20 | Base + 20 | Base + 20 | Base + 20 | Base + 20 | Base + 20 | Base + 20 | Base + 20 | Base + 20 | Base + 20 | Base + 20 |
| Register N+6 | Base + 24 | Base + 24 | Base + 24 | Base + 24 | Base + 24 | Base + 24 | Base + 24 | Base + 24 | Base + 24 | Base + 24 | Base + 24 | Base + 24 | Base + 24 | Base + 24 | Base + 24 | Base + 24 |
| Register N+7 | Base + 28 | Base + 28 | Base + 28 | Base + 28 | Base + 28 | Base + 28 | Base + 28 | Base + 28 | Base + 28 | Base + 28 | Base + 28 | Base + 28 | Base + 28 | Base + 28 | Base + 28 | Base + 28 |

FIG. 5

| Register N+0 | Thread 0 | Thread 1 | Thread 2 | Thread 3 | Thread 4 | Thread 5 | Thread 6 | Thread 7 | Thread 8 | Thread 9 | Thread 10 | Thread 11 | Thread 12 | Thread 13 | Thread 14 | Thread 15 |
|---|---|---|---|---|---|---|---|---|---|---|---|---|---|---|---|---|
| | Base + 0 | Base + 4 | Base + 8 | Base + 12 | Base + 16 | Base + 20 | Base + 24 | Base + 28 | N/A | N/A | N/A | N/A | N/A | N/A | N/A | N/A |

FIG. 6

DATA PROCESSING SYSTEMS COMPRISING GROUPED EXECUTION THREADS WITH COMMON DATA VALUES

BACKGROUND

The technology described herein relates generally to the operation of data processing systems and data processors which are operable to execute programs to perform data processing operations and in which execution threads executing a program to perform data processing operations may be grouped together into thread groups in which the plural threads of a thread group can each execute a program together (such as would be the case in a SPMD (single program, multiple data) execution arrangement).

Execution efficiency in data processing systems and data processors that execute programs to perform data processing operations may be improved by grouping execution threads (where each thread e.g. corresponds to one work "item") into "groups" or "bundles" of threads, where the threads of one group are run together, e.g. one instruction at a time. In this way, it is possible to share instruction fetch and scheduling resources between all the threads in the group. Other terms used for such thread groups include "warps" and "wavefronts". For convenience, the term "thread group" will be used herein, but this is intended to encompass all equivalent terms and arrangements, unless otherwise indicated.

An example of such a data processing system and data processor are a graphics processing system and a graphics processor (graphics processing unit (GPU)). However, other data processing systems and processors can also be operable to execute programs using execution threads which are grouped into thread groups.

In such systems, each thread may execute across appropriate functional units (circuits), such as e.g. arithmetic units of a graphics processor. Typically, there will be a plurality of functional units provided in a processor (e.g. GPU), each of which can be respectively and appropriately activated and used for an execution thread when executing a program.

In a processor where execution threads can be grouped into thread groups, the execution unit (circuit) of the processor (e.g. a shader core of a GPU) is normally correspondingly configured and operable so as to facilitate such thread group arrangements. For example (the functional units of) the execution unit may be arranged as respective execution lanes, one for each thread that a thread group may contain, so that the processor (execution unit) can execute instructions in parallel for each thread of a thread group.

In execution arrangements that use thread groups, each thread of a thread group will typically operate on its own data values (as the data to be processed may be expected to be different for each thread).

To facilitate this operation, each execution thread of a thread group, when executing a program, will typically be allocated a set of one or more registers for use by that thread when executing the program, e.g. from a register file of or accessible to the execution unit of the data processor (and correspondingly issue its own register loads and stores, independently).

Thus when executing an instruction, an execution thread will read input data values (operands) from a register or registers of a set of one or more registers allocated to that thread, and write its output value(s) back to a register or registers of the thread's register allocation.

The data will be loaded into the registers from, and written out from the registers to, an appropriate memory system of or accessible to the data processor (e.g. via an appropriate cache system (cache hierarchy)).

The Applicants believe that there remains scope for improvements to data processing systems and data processors operable to execute programs using execution threads grouped together into thread groups.

BRIEF DESCRIPTION OF THE DRAWINGS

A number of embodiments of the technology described herein will now be described by way of example only and with reference to the accompanying drawings, in which:

FIG. 1 shows an exemplary computer graphics processing system;

FIG. 2 shows schematically a graphics processing pipeline that can be executed by a graphics processor;

FIG. 5 shows the storing of a "vector" data value for a group of execution threads;

FIG. 6 shows the storing of a "scalar" data value for a group of execution threads in an embodiment of the technology described herein;

Like reference numerals are used for like components where appropriate in the drawings.

DETAILED DESCRIPTION

Figure 3:
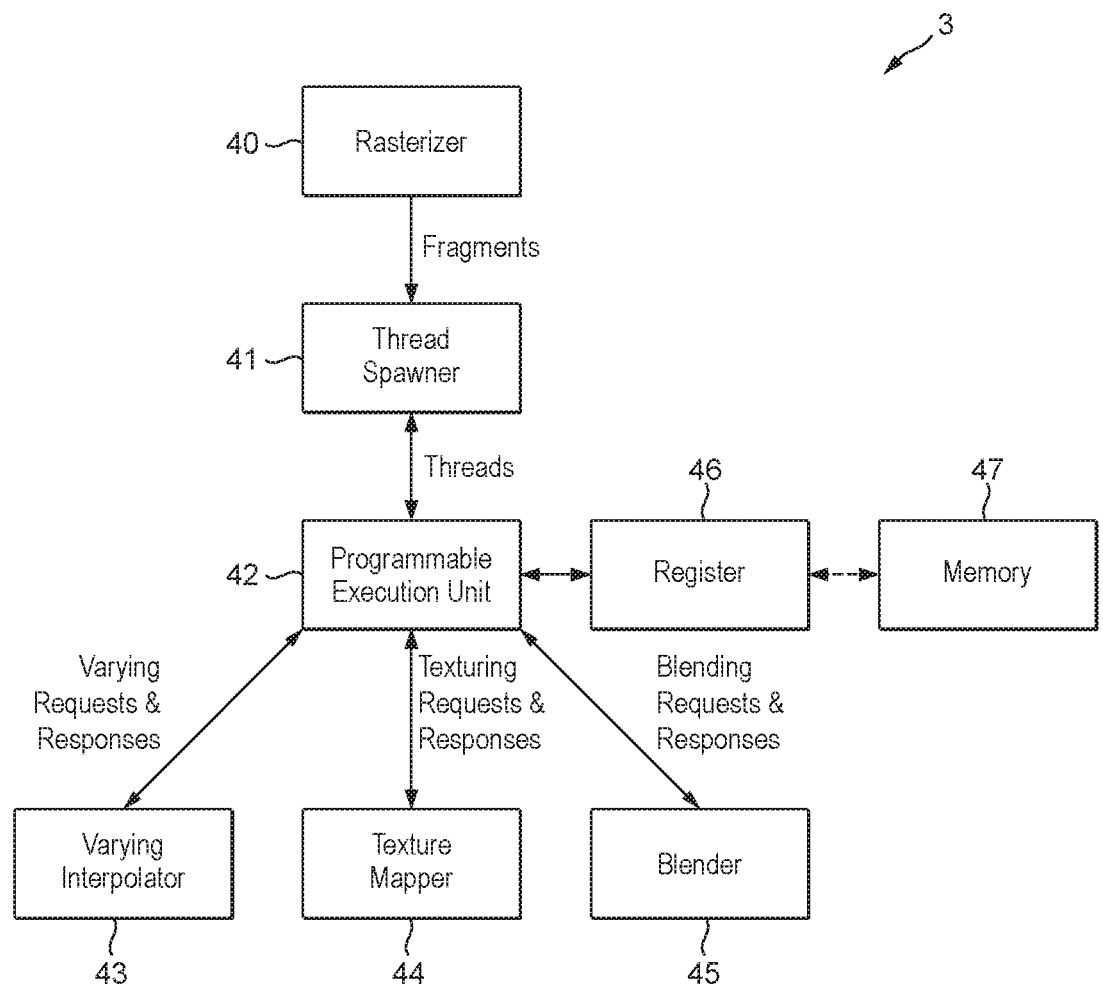
FIG. 3 shows schematically an embodiment of a graphics processor in which the technology described herein may be implemented.

A first embodiment of the technology described herein comprises a method of operating a data processor that includes a programmable execution unit operable to execute programs to perform data processing operations and in which execution threads executing a program to perform data processing operations may be grouped together into thread groups in which the plural threads of a thread group each execute a program together, with each execution thread in a thread group executing a program having an associated set of one or more registers for storing data for the execution thread while executing the program;

the method comprising:

when the threads of a thread group executing a program are all to process a same, common input data value when executing the program:

storing different portions of the common input data value to be processed by the threads of the thread group into respective registers of different threads of the group of threads, such that the common input data value is stored in a distributed fashion across registers of plural different threads of the thread group;

the method further comprising:

when a thread of the group of threads is to process the common input data value when executing the program:

providing some or all of a portion of the common input data value to be processed by the thread that is not stored in a register associated with the thread to the thread from the register of another thread in the thread group that stores the portion of the common input data value that the thread is to process; and the thread processing the some or all of the portion of the common input data value provided from the register of the another thread in the thread group.

A second embodiment of the technology described herein comprises a data processor, the data processor comprising:

a programmable execution unit operable to execute programs for execution threads to perform data processing operations and in which execution threads executing a program to perform data processing operations may be grouped together into thread groups in which the plural threads of a thread group each execute a program together;

a plurality of registers for storing data for execution threads executing a program, each execution thread of a thread group, when executing a program, having an associated set of registers of the plurality of registers for storing data for the execution thread;

the data processor further comprising:

a processing circuit configured to:

when the threads of a thread group executing a program are all to process a same, common input data value when executing the program:

store different portions of the common input data value to be processed by the threads of the thread group into respective registers of different threads of the group of threads, such that the common input data value is stored in a distributed fashion across registers of plural different threads of the thread group; and when a thread of the group of threads is to process the common input data value when executing the program:

provide some or all of a portion of the common input data value to be processed by the thread that is not stored in a register associated with the thread to the thread from the register of another thread in the thread group that stores the portion of the common input data value that the thread is to process, such that the thread may then process the some or all of the portion of the common input data value provided from the register of the another thread in the thread group.

The technology described herein relates to the execution of programs by execution threads in a data processor, in which groups of plural threads may execute a program together (such as in SPMD execution).

The technology described herein relates in particular to the handling of data values to be processed by a group of execution threads that will be the same for all the execution threads in the group. The Applicants have recognised in this regard that when executing programs using thread groups, while it may often be the case that each thread in the thread group will need to process its own individual data values, and that the input data values for the threads can differ between different threads (such that each thread will need to handle and process its own data value), there can be situations where the same, common, data value will be an input for each thread in a thread group This may be the case, e.g., where the data value is loaded from a fixed and the same memory location by each thread, or in the case where there is a cross-lane operation that results in the same value in each thread.

Such data values that will be common (the same) across a thread group can be considered to be "scalar" values (with data values that may differ per thread, and so are thus thread-dependent, being considered to be "vector" values).

In the technology described herein, such common, "scalar" data values are stored for use by threads of a thread group that is executing a program by storing respective different portions of the common, scalar data value in registers associated with different threads of the thread group. In other words, the common, scalar data value is distributed across the registers of multiple threads of the thread group.

Then, when the common, scalar data value is to be used by the threads, (some or all, as required, of) the respective portion of that data value stored in the registers of a given thread can be, and is, provided, e.g. broadcast, to other threads that need to process that portion of the data value. The Applicants have, e.g., recognised in this regard that operations, e.g., to provide data values from one thread to another thread in a thread group, such as broadcast operations (cross-lane operations), can equally be used for the purpose of providing portions of a common, scalar data value that is stored in a distributed fashion across the registers of multiple threads to other (and all) threads of a thread group, such that storing common, scalar data values in a distributed fashion in the manner of the technology described herein can be done whilst still allowing efficient processing of the data values by any individual thread of a thread group that requires the data value.

Storing a common, scalar data value in a distributed fashion across the registers of multiple threads avoids the need, e.g., to store a separate copy of the common, scalar data value for each thread, thereby improving the storage, loading and bandwidth efficiency for such common, scalar data values. The technology described herein also allows the normal sets of registers that are associated with the threads and that are used for "vector" data values to be used in an efficient manner for also handling common, scalar data values for thread groups.

Furthermore, spreading the common, scalar data value across the registers of multiple threads reduces the amount of data that needs to be loaded by each individual thread, and so can improve the loading efficiency of the scalar data value, e.g. by reducing the number of load instructions per thread that are needed to load the scalar data value.

The data processing system and data processor may comprise any system and processor operable to execute programs for processing data. The data processing system is in an embodiment a graphics processing system, and the data processor is in an embodiment a graphics processor.

The program(s) which are executed by the data processor may comprise any suitable and desired program(s). For example, in the case of a graphics processor, a program may be, and is in an embodiment, a (graphics) shader program. The program may be, for example, a geometry shader program (a program for executing geometry shading operations), a vertex shader program (a program for executing vertex shading operations), a fragment shader program (a program for executing fragment shading operations), or a compute shader program (a program for executing compute shading operations).

The program will comprise a sequence of instructions to be executed by the execution threads. The set (sequence) of instructions being executed for the program can be any desired and suitable instructions.

The data processor includes a programmable execution unit (circuit) operable to execute programs for groups of execution threads.

The programmable execution unit can include any desired and suitable components/elements (circuits) for this purpose.

In an embodiment it comprises at least an instruction execution processing circuit operable to execute instructions to perform processing operations for execution threads of a thread group executing a program, which is in an embodiment configured as a plurality of execution lanes, each execution lane being operable to perform processing operations for a respective execution thread of a thread group;

The programmable execution unit in an embodiment also comprises a thread generation circuit (spawner) that generates the threads and thread groups. There may then, e.g., and in an embodiment, be an appropriate thread group scheduler (circuit) that issues thread groups to the instruction execution processing circuit for execution. Other arrangements would, of course, be possible.

The instruction execution processing circuit may be operable and arranged as any desired (plural) number of execution lanes. In an embodiment, there are as many execution lanes as the (maximum) number of threads that may be included in a thread group (although other arrangements would be possible, if desired).

Each execution lane is operable to perform processing operations for a respective execution thread of a thread group. Each execution lane is in an embodiment provided by one or more functional units operable to perform data processing operations for an instruction being executed by an execution thread.

The instruction execution processing circuit, execution lanes, and functional units can be implemented as desired and in any suitable manner. They will comprise (be implemented as) suitable hardware elements such as processing circuits (logic).

The data processor in an embodiment also comprises any other appropriate and desired units and circuits required for the operation of the programmable execution unit, such as appropriate control circuits (control logic) for controlling the execution unit to cause and to perform the desired and appropriate processing operations.

The data processor in an embodiment also comprises one or more of, and in an embodiment all of: instruction fetch, instruction decode and instruction issue circuits and an instruction cache.

As well as the programmable execution unit, the data processor includes a group of plural registers (a register file) operable to and to be used to store data for execution threads that are executing a program. Each thread of a group of execution threads that is executing a program will have an associated set of registers to be used for storing data for the execution thread (either input data to be processed for the execution thread or output data generated by the execution thread) allocated to it from the overall group of registers (register file) that is available to the programmable execution unit (and to execution threads that the programmable execution unit is executing).

The register file can take any suitable and desired form and be arranged in any suitable and desired manner, e.g., as comprising single or plural banks, etc.

The data processor will correspondingly comprise appropriate load/store units (circuits) and communication paths for transferring data between the registers/register file and a memory system of or accessible to the data processor (e.g., and in an embodiment, via an appropriate cache hierarchy).

The memory and memory system is in an embodiment a main memory of or available to the data processor, such as a memory that is dedicated to the data processor, or a main memory of a data processing system that the data processor is part of.

Each execution thread and thread group can relate to any suitable and/or desired work "item" that the program in question is to be executed for. For example, in the case of a graphics processor, each thread may correspond to a vertex or a sampling position, with the thread groups corresponding to appropriate sets of plural vertices or sampling positions. For example, each thread group may correspond to one or more graphics fragments, with each thread in the thread group then corresponding to a respective sampling position that the fragment(s) represent.

The thread groups (the groups of plural threads) that the execution threads executing the program are grouped into can be any suitable and desired size. The thread groups are in an embodiment all the same size (at least for a given instance of a program execution). In an embodiment, there is a fixed thread group size that the data processor supports. The thread groups may contain, e.g. 4, 8, 16 or 32 threads (i.e. there is a "warp width" of 4, 8, 16 or 32).

The programmable execution unit may in general, and is in an embodiment configured to, execute a program for the threads of a thread group such that the plural threads of the thread group each execute the program together in lockstep, e.g. one instruction at a time.

The technology described herein relates to the operation of the data processor when a thread group is executing a program together, and an input value for the threads of the thread group is the same for all the threads of the thread group. The same, common, "scalar" input data value for the threads of the thread group in this regard can be any data value that is the same for and common to all the threads in the thread group, such as, for example, a data value that is to be loaded from the same, fixed memory location by each thread, or that is the result of a cross-lane operation, such as a minimum or maximum operation, that results in the same value in each thread of the thread group.

The technology described herein can be used for any data value that will be common (scalar) for the threads of a thread group, such as data that is known to be constant for every thread group (e.g. that is constant for the entire draw call (or other task) in question).

However, it can also be used for data values (variables) that will be constant for a given thread group (warp), but that can vary in value between different thread groups. Thus the requirement is that the data value (the value of the variable) is the same for all the threads in the thread group in question, but it does not need to be a constant across plural thread groups.

As will be discussed further below, such a common, scalar input data value can be identified in any suitable and desired manner.

For example, the compiler may be able to prove that the value is scalar. For example, it would be possible to identify the presence of a common, scalar input data value where the index or base pointer of data to load is the result of a cross-lane operation that is guaranteed to leave the same result in each thread (such as a minimum or maximum operation across the thread group). In this case, it may also be able to be determined that any subsequent operations that use only known scalar values, including but not limited to loads will also correspondingly result in other common, scalar data. Thus, for example, a sequence of instructions ending in a cross-lane operation that is then followed by a sequence of instructions using only those results and other constant data, followed by a series of loads, could be identified, and it could correspondingly be determined that all the relevant loads can be treated as common, scalar input data values (and thus handled in the manner of the technology described herein).

Additionally or alternatively, it could be known from the API that the data is constant for the entire draw call (or other task), or other appropriate API mechanisms, such as an appropriate shader language extension (for example to explicitly annotate buffer bindings to indicate that data accessed through that binding will be constant per thread group), could be used to indicate that data is constant per thread group.

Other arrangements would, of course, be possible.

In the technology described herein, when the threads of a thread group executing a program are all to process the same, common, scalar input data value, (a single copy of) that common input data value is stored in a distributed fashion across the registers of plural threads of the thread group (instead of storing plural (identical) copies of the scalar data value, one for each thread of the thread group).

Thus in the technology described herein, plural threads of the thread group will each store (in a register or registers allocated to the thread) a respective portion (i.e. some but not all) of the common input data value. In one embodiment, all the threads of the thread group store a respective, different portion of the common input data value, but in other embodiments only some but not all of the threads in the thread group store a portion of the common input data value.

In an embodiment, the common, scalar input data value is divided into a plurality of equal sized portions, such that each thread that is storing a portion of the common input data value, stores a same sized portion of the common input data value. This subdivision may be based, e.g., upon the number of threads in the thread group, and/or a preferred storage size per thread.

In the latter case, the number of threads that will need to store a portion of the common input data value will accordingly correspond to the total size of the common input data value divided by the selected storage size per thread (which may, e.g., correspond to the size of a register (or an integer number of registers)). In an embodiment the number of threads for which storage for the common input data value is allocated is rounded to the next (integer) multiple of the number of threads in the thread group (so to the size of the thread group if fewer threads than that are actually needed), so that the same amount of storage (number of registers) is allocated for storing a common input data value per thread (even if some threads may not actually store a portion of the data value in question).

In an embodiment, the common input data value is distributed into portions across the number of threads that can load data per load operation (in a thread group wide load operation). In this case each thread will load an amount of data corresponding to the total size of the common input data value divided by the number of threads that a thread group-wide load operation supports.

When the common input data value is to be stored for the group of threads by loading it from memory, each thread of the thread group that is to store a portion of the common input data will accordingly load from memory the portion of the common input data value that it is to store, and store that portion of the input data value in the appropriate register or registers associated with the thread.

The particular portion of the input data value to be loaded for a given thread can be identified and determined in any suitable and desired manner. In an embodiment, this is done by using an offset into the input data value based on the position of the thread within the thread group (e.g. the index of the thread within the thread group), for example, and in an embodiment, by determining an offset from a base address for the common input data value (that denotes a base, and in an embodiment the start, memory location of the common input data value to be loaded) based on the thread position (index) within the thread group. The thread will then, e.g., and in an embodiment, load the amount of data to be stored by each thread, starting (e.g.) from the determined offset for the thread.

The loading of the common, scalar input data value into registers of respective threads of the thread group can be achieved in any suitable and desired manner. In an embodiment this is done by the thread group executing an appropriate load instruction, and in an embodiment a thread group-wide load instruction, that causes the common input data value to be loaded across the registers of threads of the thread group in the appropriate manner.

Once the common, scalar input data value has been stored in a distributed fashion across the group of threads, then that common, scalar input data value can be processed by the threads (can be used as an input data value for a data processing operation or operations to be performed by the threads of the thread group when executing the program).

When performing a data processing operation that is to use the common, scalar input data value, as each individual thread will only store in its respective registers either a portion (or none) of the common, scalar input data value, a thread (and each thread) of the thread group that is to process the common, scalar input data value, will require a portion or portions of the common, scalar input data value that are being stored in registers associated with other threads of the thread group.

In the technology described herein, this is facilitated by providing data from a portion of the common, scalar input data value that is stored in the registers of another thread in the thread group to a (and in an embodiment to each) thread of the thread group that requires data from the portion in question. In an embodiment, all the portions of the common, scalar input data value that are stored in the registers of other threads in the thread group are correspondingly provided to a (and to each) thread of the thread group (that requires the data value).

Data from a portion of the common, scalar input data value can be provided from one thread to other threads in the thread group in any suitable and desired manner.

In one embodiment, this is done using an appropriate cross-lane (cross-thread) operation, such as, and in an embodiment, an appropriate broadcast operation that can, e.g., and in an embodiment, broadcast (copy) a value (data) from a single thread to one or more, and in an embodiment to all, other threads in a thread group. In an embodiment a broadcast operation that copies data from one thread to plural other threads within the thread group (and in an embodiment to all threads in the thread group, including the thread originally having the value), is used for this purpose.

The Applicants have recognised in this regard that many data processors that execute programs to perform data processing operations and that support program execution using thread groups, will also support cross-lane operations when executing a program, to allow data values to be moved and/or shared between different threads in a thread group that are executing a program together. In an embodiment, these cross-lane operations, and in an embodiment appropriate broadcast operations, are used to provide the relevant portions of a common, scalar input data value that has been stored in a distributed fashion across plural threads, to other (and in an embodiment the remaining) threads of a thread group that require the portion of the data value in question.

Thus, in an embodiment, the method of the technology described herein comprises (and the programmable execution unit is correspondingly configured to) providing some or all of a portion of the common input data value that is not stored in a register associated with a thread to the thread from a register or registers associated with another thread of the thread group by executing a cross-lane operation, and in an embodiment a broadcast operation, that is operable to broadcast data from the portion of the common input data value stored in the register or registers associated with one thread to one or more, and in an embodiment all, of the other threads of the thread group.

Data from a portion of the common input data value may be provided to another thread in any suitable and desired manner. For example, the data may be written to a register associated with the another thread. In an embodiment, the data is provided by communicating it from the register(s) of the thread that is storing the portion in question to the other thread or threads directly, without the need to transfer it to a register of the other thread or threads first, e.g., and in an embodiment, in the existing manner for cross-lane operations that the data processor supports. The programmable execution unit accordingly in an embodiment includes appropriate data communication paths for this purpose, such as data communication paths that are otherwise provided to support and perform cross-lane operations. Thus, in an embodiment, threads can load data from another thread (instead of from a register), and that is used in the technology described herein.

The operation in this regard could be to provide (e.g. broadcast) the entire portion of the common, scalar input data value that is stored by a thread to the other thread(s), or it could be to provide only some but not all of the portion of the common, scalar input data value that is stored by the thread, as desired.

In an embodiment, the common input data value is processed by the threads of the thread group processing respective parts of the common input data value separately to each other, e.g. one after another. In this case, particularly if the threads of the thread group are executing the program in lockstep (and in an embodiment that is the case), all the threads will require a (and the) same part of the common input data value for processing at the same time (in their respective execution of the program).

Accordingly, in an embodiment, the operation to provide some or all of a portion of the common, scalar input data value stored by one thread to another thread or threads of the thread group first determines which thread of the thread group stores the required portion of the common, input data value, and then triggers that identified thread to provide the required part of the common, scalar input data value to one or more of, and in an embodiment all of, the other threads in the thread group.

In an embodiment, the amount and position of the part of the data from the common, scalar input value to be provided to (all the) threads of the thread group for processing is specified, and that information is then used to identify the thread, and the data stored by that thread, to be provided (e.g. broadcast) to (the) other threads of the thread group. The position of the part of the input data value to be broadcast may, e.g., be specified as an offset indicating the start position for the data in the overall common, scalar input data value.

For example, and in an embodiment, the start position for the part of the scalar data value to be provided is first used to identify which thread of the thread group stores the required data (e.g., and in an embodiment, by dividing the start position (e.g. offset into the data value) by the size of each portion of the common, scalar input data value stored by an individual thread). Then, once the thread which stores the required data has been identified, the start position within the data value portion stored by the identified thread for the data to be provided to (the) other threads is in an embodiment determined, e.g., and in an embodiment, again as an offset into the portion of the data value stored by the thread in question, with the operation then broadcasting the required amount of data starting from the determined offset from the thread in question to one or more, and in an embodiment all, of the other threads in the thread group.

The thread or threads of the thread group may only process one part (a portion) of the scalar input data value, or they may process plural parts (data from plural portions) or the whole data value, as required and as desired. Where a (and each) thread is to process plural parts of the data value from portions stored by different threads, then in an embodiment a sequence of, e.g., broadcast, operations is performed, to provide the data from the different threads to all the threads in the thread group from one thread at a time, e.g., and in an embodiment, one after another.

Once the thread or threads have received a relevant part of the common, scalar, input data value, they can, and will, process that data as required, e.g. by using it as an input (operand) when executing other, subsequent, instructions in the program and/or by providing it as an output for the thread or threads.

The operation in the manner of the technology described herein of storing a common, scalar input data value in a distributed fashion across plural threads of a thread group, and then providing some or all of the common, scalar input data value to other threads of the thread group as required, can be implemented and triggered in any suitable and desired manner.

In one embodiment, this operation is exposed to applications (to an application programmer (to the API)), such that applications that require data processing by the data processor can indicate a requirement for operation in the manner of the technology described herein.

In an embodiment, this is done by providing and defining a set of functions that applications can call to indicate to load, and then read from, common, scalar input data values.

In this way, an application would be able to indicate an appropriate function call to trigger operation in the manner of the technology described herein, with, e.g., the compiler for the data processor then identifying such function calls and configuring the program execution on the data processor accordingly.

In this case, there is in an embodiment a "load" function provided for loading (reading) (scalar) data from memory into a set of registers distributed across plural threads of a thread group in the manner of the technology described herein. This function may, for example, and in an embodiment, take as inputs a memory location (e.g. a base address) for, and total size of, the input data value to load (which may, e.g., be specified by setting appropriate parameters for those inputs), and be operable to determine how much data to load per thread, and issue a thread group-wide load instruction that causes each thread to load the appropriate portion of data from the common, scalar input data value (e.g., and in an embodiment, the amount of data to load per thread, starting from a position offset appropriately from the base memory location for the data value (e.g., and in an embodiment as discussed above, based on the thread index)).

There is then in an embodiment a corresponding "broadcast" function operable to and that triggers the providing of data from the register or registers of one thread to other, and in an embodiment all of the other, threads in the thread group.

In this case, this broadcast function is in an embodiment operable to take as inputs the identity of the common, scalar data value to be provided to the threads of the thread group, the amount of data from the scalar data value to be broadcast to the threads of the thread group, and the position within the scalar data value from which the data to be broadcast should be taken (e.g. in terms of an offset into the data value) (which may, e.g., again be specified by setting appropriate parameters for those inputs), and (first) determine which thread of the thread group contains the required data to be broadcast (e.g., and in an embodiment, based on the position (offset) within the scalar data value from which the data to be broadcast should be taken and how much data is stored per thread), then determine an offset into the identified thread's data portion to broadcast, and to then broadcast the indicated amount of data from the identified thread starting at the appropriate position to one or more and in an embodiment all of the other threads in the thread group.

In an embodiment, the operation of these functions is constrained to only be permitted in the case where all threads in the thread group are (guaranteed to be) active (e.g. none of them have been terminated or masked off due to divergence) at the point where the functions are called. This condition may be, e.g., and in an embodiment, be verified, e.g., by the compiler, at runtime, and if it is met the appropriate program with the functions is issued to the data processor for execution. On the other hand, when it cannot be verified (guaranteed) that all the threads in the thread group will be active at the appropriate time, then in an embodiment a default operation in which each thread stores and uses its own copy of the common, scalar input data value, is used instead.

In an embodiment, the operation in the manner of the technology described herein can also or instead, and in an embodiment also, be triggered and implemented by means of the compiler and when compiling the program for execution, without there being any explicit indication that this operation is required from the application. In other words, the operation in the manner of the technology described herein can in an embodiment be implemented and triggered through compiler inference.

The Applicants have recognised that this would be possible, because the compiler can be configured to infer when input data values will be the same (scalar) across a thread group, and when operation in the manner of the technology described herein is accordingly likely to be beneficial.

In this case, the compiler can infer that an input data value will be a common, "scalar" input data value for a group of threads in any suitable and desired manner, for example, and in an embodiment, based on one or more of, and in an embodiment both of: whether the input data value is first loaded from the same, fixed memory location by each thread; and whether the input data value is the result of a cross-lane operation that results in the same value in each thread (such as a minimum or maximum operation). As discussed above, the compiler may also be able to identify sequences of instructions that use scalar values, and/or use API-provided information to identify scalar input data values.

In the case where a common, scalar input data value is identified by the compiler, then the compiler can configure the program execution to load that data value in the manner of the technology described herein (e.g. using a group wide load operation and instruction as discussed above), and to perform any reads from that data value in the manner of the technology described herein (e.g. by using a cross-lane broadcast operation and instructions in the program as appropriate).

This operation is again in an embodiment constrained to only be used in the case where all threads in the thread group are (can be guaranteed to be) active (at the point it is performed). Again, if it cannot be verified (guaranteed) that all the threads will be active for all reads to the common, scalar data value, then the compiler in an embodiment reverts to a default per-thread storage approach as discussed above.

It would also be possible for the compiler to operate to re-order operations in the program to ensure that all threads remain active for reads to the scalar data, where it is possible to do that (and in an embodiment that is done). Correspondingly, the program execution may also or instead be configured so that threads are not inactivated or terminated (even if they otherwise would be) so that threads that may be required to broadcast scalar data values during program execution will remain "alive" if required.

It would also be possible in this regard for the application (programmer) to be able to indicate (declare) an intention that a variable in a program should be considered to be scalar (e.g. by defining a portion of memory as being "scalar"), as a hint to the compiler to operate in this manner. In this case, the compiler would, based on the declaration (hint) attempt to verify that the variable in question is scalar, and if that can be verified, then operate in the above manner (or if not, perform some other operation, e.g., error with a suitable message).

The compiler (the compiler processing circuit) in an embodiment is part of and executes on a central processing unit (CPU), such as a host processor, of the data processing system that the data processor is part of, and in an embodiment is part of a driver for the data processor that is executing on the CPU (e.g. host processor). Other arrangements would be possible.

Although the above operation of the technology described herein has been described primarily with reference to the handling of a given, single, scalar input data value, it will be appreciated that there may be more than one common data value during execution of a given program, and that plural common, scalar input data values may exist and be being used simultaneously, and/or one after the other. The technology described herein can be, and is in an embodiment, applied correspondingly to plural, and in an embodiment to each, common, scalar input data value that arises when executing a program for a thread group.

Equally, registers associated with the threads of a thread group may alternate between being used for storing (portions of) common, scalar input data values, and other (vector) data values during and over the execution of the program, as appropriate and as desired. It would also correspondingly be possible for there to be plural, common scalar data values being stored in a distributed fashion across the threads of a thread group at the same time where that is required or appropriate for the program execution. In this case, it could be that registers of a first subset of the threads of the thread group are used to store a first common scalar data value in a distributed fashion, with the, in an embodiment corresponding, registers of another, different, subset of the threads of the thread group then being used to store another, different common scalar input data value in a distributed fashion for the thread group at the same time (e.g., and so on, depending upon the size of the common, scalar input data values, the size of the portions of those values that each thread stores, and the number of threads in the thread group).

In some embodiments, the data processor comprises, and/or is in communication with, one or more memories and/or memory devices that store the data described herein, and/or store software for performing the processes described herein. The data processor may also be in communication with a host microprocessor, and/or with a display for displaying images based on the data generated by the data processor.

In an embodiment, the data processor is part of an overall data processing system that comprises one or more memories and/or memory devices and a host processor (and, optionally, a display). In an embodiment, the host microprocessor is operable to execute applications that require data processing by the data processor, with the data processor operating in the manner of the technology described herein when required to process data by applications executing on the host processor.

The host processor will send appropriate commands and data to the data processor to control it to perform data processing operations and to produce data processing output required by applications executing on the host processor. To facilitate this, the host processor in an embodiment also executes a driver for the data processor and a compiler or compilers for compiling programs to be executed by the programmable execution unit of the data processor.

Other arrangements would, of course, be possible.

The technology described herein can be used for all forms of output that a data processor may be used to generate. For example, in the case of graphics processing, the graphics processor may generate frames for display, render-to-texture outputs, etc. The output data values from the processing are in an embodiment exported to external, e.g. main, memory, for storage and use, such as to a frame buffer for a display.

The technology described herein is applicable to any suitable form or configuration of data processor and data processing system. It is particularly applicable to graphics processors and graphics processing systems. Thus in an embodiment, the data processor is a graphics processor.

However, the data processor of the technology described herein may be equally applicable to and can be used in other multi-threaded (thread group (warp)-based) processing units, and not just graphics processing units. For example, the technology described herein could equally be used for a multi-threaded neural network processor (NPU), if desired.

In an embodiment, the various functions of the technology described herein are carried out on a single data processing platform that generates and outputs data (e.g. rendered fragment data) to a suitable output (e.g. by writing to a frame buffer for a display device).

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuits, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits, etc., if desired.

Subject to any hardware necessary to carry out the specific functions discussed above, the data processor and system can otherwise include any one or more or all of the usual functional units, etc., that data processors and systems include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising a data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of a graphics processor operable to execute graphics shader programs.

FIG. 1 shows an exemplary computer graphics processing system.

An application 2, such as a game, executing on a host processor 1 will require graphics processing operations to be performed by an associated graphics processing unit (GPU) (graphics processor) 3 that executes a graphics processing pipeline. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 2 shows the graphics processing pipeline 5 that is executed by the graphics processor 3 in the present embodiments in more detail.

The graphics processing pipeline 5 shown in FIG. 2 is a tile based renderer and will thus produce tiles of a render output data array, such as an output frame to be generated.

(In tile based rendering, rather than the entire render output, e.g., frame, effectively being processed in one go as in immediate mode rendering, the render output, e.g., frame to be displayed, is divided into a plurality of smaller sub regions, usually referred to as "tiles". Each tile (sub region) is rendered separately (typically one after another), and the rendered tiles (sub regions) are then recombined to provide the complete render output, e.g., frame for display. In such arrangements, the render output is typically divided into regularly sized and shaped sub regions (tiles) (which are usually, e.g., squares or rectangles), but this is not essential.)

The render output data array may typically be an output frame intended for display on a display device, such as a screen or printer, but may also, for example, comprise intermediate data intended for use in later rendering passes (also known as a "render to texture" output), etc.

(When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 2 shows the main elements and pipeline stages of the graphics processing pipeline 5 that are relevant to the operation of the present embodiments. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuits (processing logic), etc., for performing the necessary operation and functions.

As shown in FIG. 2, the graphics processing pipeline 5 includes a number of stages, including a vertex shader 20, a hull shader 21, a tesselator 22, a domain shader 23, a geometry shader 24, a rasteriser 25, an early Z (depth) and stencil test 26, a renderer in the form of a fragment shader 27, a late Z (depth) and stencil test 28, a blender 29, a tile buffer 30 and a downsampling and writeout (multisample resolve) circuit 31.

The vertex shader 20, hull shader 21, tessellator 22, domain shader 23, and geometry shader 24 together effectively perform all the necessary fragment frontend operations, such as transformation and lighting operations, and primitive setup, to setup the primitives to be rendered, in response to commands and vertex data provided to the graphics processing pipeline 5.

The rasteriser 25 of the graphics processing pipeline 5 operates to rasterise the primitives making up the render output (e.g. the image to be displayed) into individual graphics fragments for processing.

The fragments generated by the rasteriser are then sent onwards to the rest of the pipeline for processing.

The early Z/stencil test 26 performs a Z (depth) test on fragments it receives from the rasteriser 25, to see if any fragments can be discarded (culled) at this stage. At the same time, an early stencil test is carried out.

Fragments that pass the fragment early Z and stencil test 26 are then sent to the fragment shader (renderer) 27. The fragment shader 27 performs the appropriate fragment processing operations on the fragments that pass the early Z and stencil tests, so as to process the fragments to generate the appropriate rendered fragment data. In the present embodiment, the fragment shader 27 is in the form of a shader pipeline (a programmable fragment shader).

There is then a "late" fragment Z and stencil test 28.

The fragments that pass the late fragment test 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30. The depth value for an output fragment is also written appropriately to a Z buffer within the tile buffer 30. (The tile buffer stores colour and depth buffers that store an appropriate colour, etc., or Z value, respectively, for each sampling point that the buffers represent (in essence for each sampling point of a tile that is being processed).)

Once a tile is finished, the data from the tile buffer 30 is output (written back) to an external memory output buffer, such as a frame buffer of a display device (not shown), by writeout unit 31.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 5 would, of course, be possible.

As can be seen from FIG. 2, the graphics processing pipeline 5 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application.

To do this, the application 2 provides the shader programs implemented using a high-level shader programming language, such as GLSL, HLSL, OpenCL, etc. These shader programs are then translated by a shader language compiler 6 to binary code for the target graphics processing pipeline 5. This may include the creation of one or more intermediate representations of the program within the compiler.

The compiler 6 may, e.g., run on the host processor 1 of the data processing system that includes the graphics processor 3. (The compiler 6 may, e.g., be part of the driver 4, with there being a special API call to cause the compiler to run. The compiler execution can thus be part of the draw call preparation done by the driver in response to API calls generated by an application.)

FIG. 2 shows schematically the operation stages of the graphics processor 3.

FIG. 3 shows functional units of the graphics processor 3 that are used to perform (and thus to act as) various ones of the processing operations and stages of the graphics processing pipeline 5 shown in FIG. 2. (There may be other functional units in the graphics processor 3.)

As shown in FIG. 3, the graphics processor 3 includes a thread spawner 41, a programmable execution unit 42, a varying interpolator 43, a texture mapper 44, a blender 45, and storage in the form of a set of registers 46, in communication with memory 47 of the data processing system.

The programmable execution unit 42 operates to execute shader programs to perform the shader operations of the graphics processing pipeline, such as the hull shader, the vertex shader and the fragment shader. To do this, it receives execution threads from the thread spawner 41 and executes the relevant shader program for those execution threads. As part of this operation, and as shown in FIG. 3, the execution threads will read data from and write data to respective registers of the register file 46.

As part of this processing, and as shown in FIG. 3, the programmable execution unit 42 can call upon the varying interpolator 43, the texture mapper 44 and the blender 45 to perform specific graphics processing operations.

The thread spawner 41 is operable to spawn execution threads for execution by the programmable execution unit 42, e.g. for fragments that it receives from the rasteriser 40 (when executing a fragment shader program, for example).

The thread spawner 41 will, e.g., determine which shader program(s) are to be executed, and then spawn threads to execute those programs. In the present embodiments, the threads are grouped into thread groups ("warps") containing plural threads (such as 16 threads) such that instructions in a stream of instructions for a program can be executed in lockstep among the threads of the thread group.

The programmable execution unit 42 comprises various functional units for performing processing for the threads received from the thread spawner 41. The functional unit or units can comprise any desired and suitable functional unit or units operable to perform data processing operations in response to and in accordance with program instructions. Thus the functional unit or units in an embodiment comprise one or more or all of: arithmetic units (arithmetic logic units) (add, subtract, multiply, divide, etc.), bit manipulation units (invert, swap, shift, etc.), logic operation units (AND, OR, NAND, NOR, NOT, XOR, etc.), load type units, store type units, etc.

Figure 4:
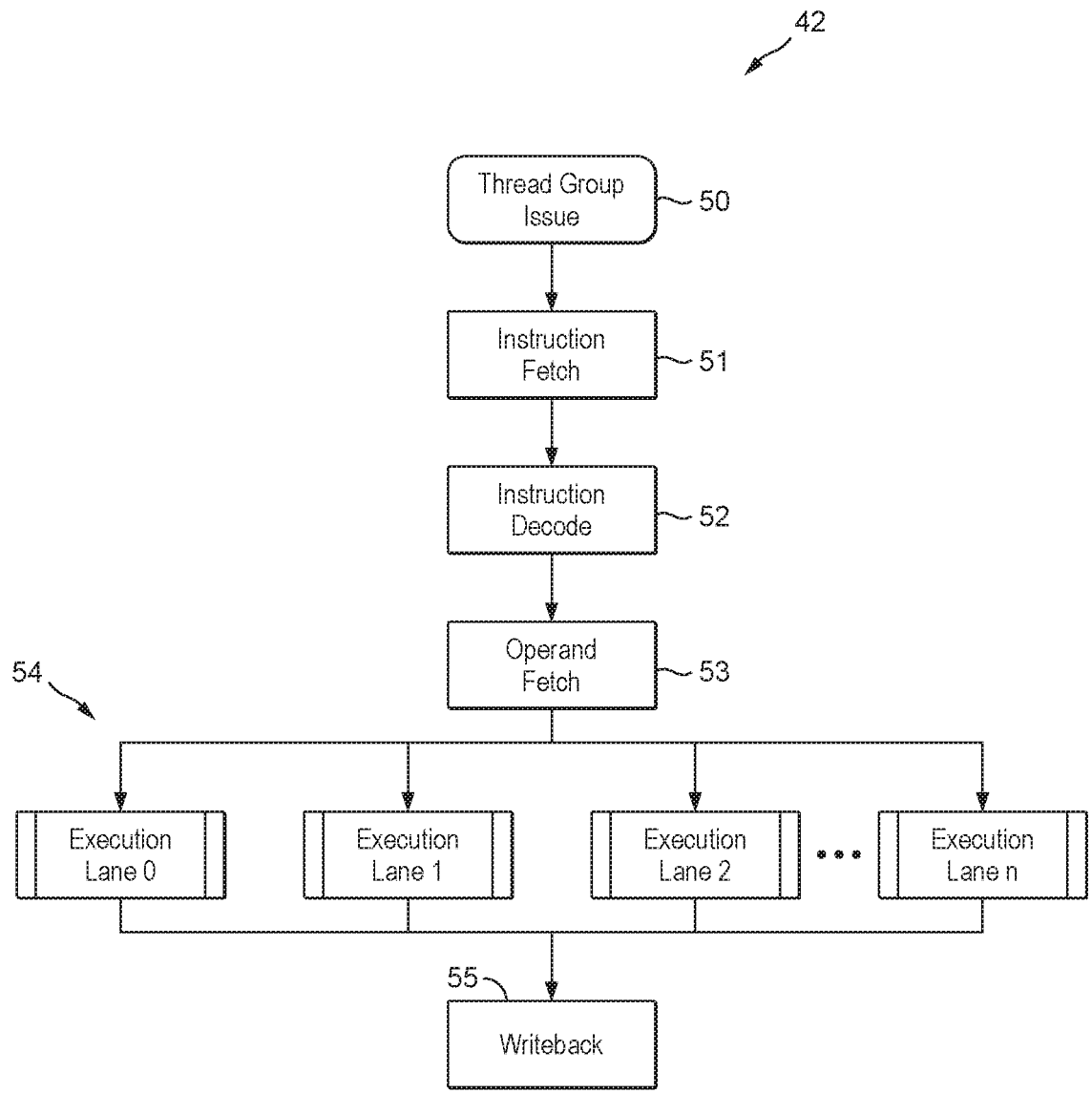
FIG. 4 shows the programmable execution unit of the graphics processor of FIG. 3 in more detail.

FIG. 4 shows the programmable execution unit 42 in more detail.

In the present embodiments, and as shown in FIG. 4, the functional units of the programmable execution unit 42 are arranged as a plurality of execution lanes 54, corresponding by the number of threads in a thread group (e.g. 16).

As shown in FIG. 4, the programmable execution unit 42 includes an appropriate instruction fetch circuit 51 that will fetch instructions to be executed for an issued thread group ("warp") 50 which has been spawned by the thread spawner 41.

The programmable execution unit 42 includes an instruction decoding circuit 52 that decodes the instructions.

After decoding an instruction, the execution unit 42 fetches any operands associated with the instruction into respective registers associated with the threads of the thread group, using an appropriate operand fetch circuit 53.

After the instruction has been decoded and the operands for the operation have been fetched, the programmable execution unit will then perform the processing operation that the instruction requires, using the functional units of the execution lanes 54 as appropriate.

The programmable execution unit 42 also includes a writeback circuit 55 operable to, after executing an instruction, perform a writeback operation to write out the result from the execution of the instruction. The writeback operation may comprise writing out the result for all of the threads of a thread group for the instruction, such that the results (for all of the threads) are then available for use, e.g. when executing a subsequent instruction in the stream of instructions (program).

As discussed above, when executing a program for a thread group, each thread in the thread group will be allocated a set of registers from the register file 46 for storing data (such as input and output values) for the thread in question.

In the normal course, as the actual value for many variables will potentially differ between individual threads within a thread group, each thread within a thread group will typically store its own respective, individual data value for a given, e.g., input operand to be processed when executing an instruction.

FIG. 5 illustrates this, and shows each thread in a thread group 60 (comprising 16 threads) storing its own respective copy of an input data value 61 in a corresponding set of eight registers.

However, the Applicants have recognised that there can be situations where the same, common, "scalar" data value will be an input for each thread in a thread group (where the value of a variable will be and is the same for all the threads in the thread group in question). This may be the case, e.g., where the data value is loaded from a fixed and the same memory location by each thread, or in the case where there is a cross-lane operation that results in the same value in each thread.

In the present embodiments, and in accordance with the technology described herein, such common, "scalar" data values are stored for use by threads of a thread group when executing a program in distributed fashion across the registers of multiple threads of the thread group. In other words, instead of storing N copies of the common, scalar data value in N threads, one copy only is stored, spread across the registers of multiple threads.

FIG. 6 illustrates this, and shows respective portions 70 of a common, scalar data value 71 being stored in the registers of plural threads of the thread group 60, such that the thread group 60 stores a single copy of the common, scalar data value across the thread group as a whole. (In the example shown in FIG. 6, as the single scalar data value 71 is of a size that only requires distributing across registers of eight threads of the thread group, the corresponding registers of the remaining threads of the thread group can, for example, be used to store another, common, scalar data value in a distributed fashion, if desired.)

Thus, in the present embodiments, if the scalar data value has size TOTAL SIZE and the preferred storage size per thread is BYTES PER THREAD (e.g. one register per thread), then BYTES PER THREAD will be reserved in at least TOTAL SIZE/BYTES PER THREAD threads for storing the scalar data value. In the present embodiments, this number of threads is rounded up to the next multiple of the number of threads in the thread group, so that a consistent number of registers are allocated to scalar storage per thread.

In an embodiment, the common input data value is distributed into portions across the number of threads that can load data in a single load operation (in a thread group wide load operation).

When such a common, scalar input data value is to be loaded for a thread group, each thread of the thread group that is to store a portion of the common input data value will accordingly load from memory the portion of the common input data value that it is to store, and store that portion of the input data value in the appropriate register or registers associated with the thread.

In the present embodiments, the particular portion of the input data value to be loaded for a given thread is identified and determined by using an offset into the input data value based on the position of the thread within the thread group (the index of the thread within the thread group), by, as shown in FIG. 6, determining an offset from a base address for the common input data value based on the thread's position (index) within the thread group (with a thread then loading the amount of data to be stored by each thread, starting from the determined offset for the thread).

In the present embodiments, the loading of the common, scalar input data value into registers of respective threads of the thread group is done by the thread group executing a thread group-wide load instruction that causes the common input data value to be loaded across the registers of threads of the thread group in the appropriate manner.

Once the common, scalar input data value has been stored in a distributed fashion across the group of threads, then that common, scalar input data value can be processed by the threads (can be used as an input data value for a data processing operation or operations to be performed by the threads of the thread group when executing the program).

To do this, data from a portion of the common, scalar input data value that is stored by one thread of the thread group is, in one embodiment, provided to the other threads in the thread group using a cross-lane broadcast operation that broadcasts the data from the one thread to the other threads within the thread group (e.g. using appropriate data communication paths provided for the purpose of such broadcast operations). (An example of such an operation is an appropriate subgroup operation in the Vulkan API.)

Figure 7:
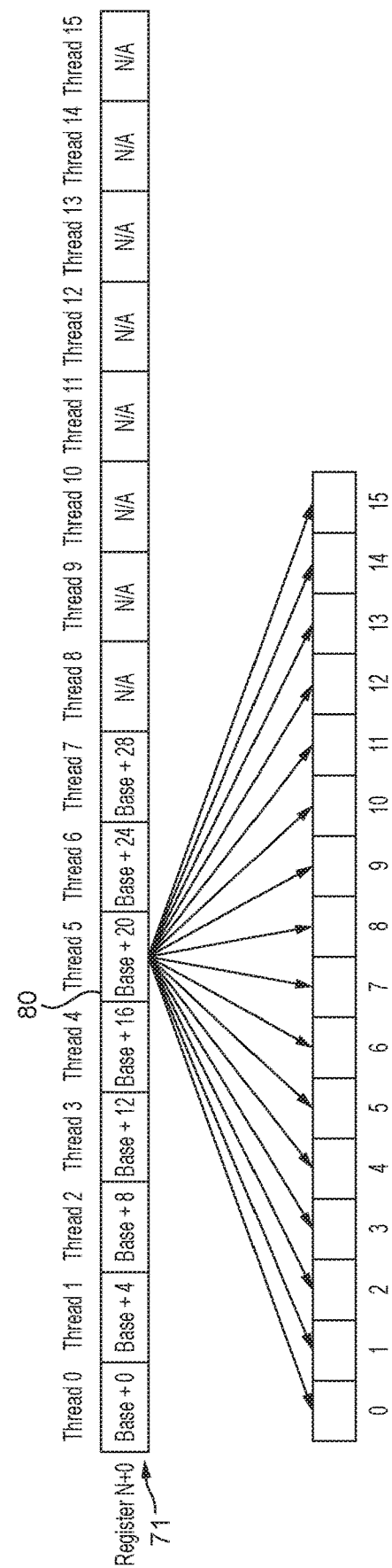
FIG. 7 shows the broadcasting of a portion of a "scalar" data value to the threads of a thread group in an embodiment of the technology described herein.

FIG. 7 illustrates this and shows the data portion 80 of the common, scalar data value 71 stored, in this example, by the sixth thread in the thread group (thread 5), being broadcast to all the threads in the thread group (including thread 5) for use by those threads.

Figure 8:
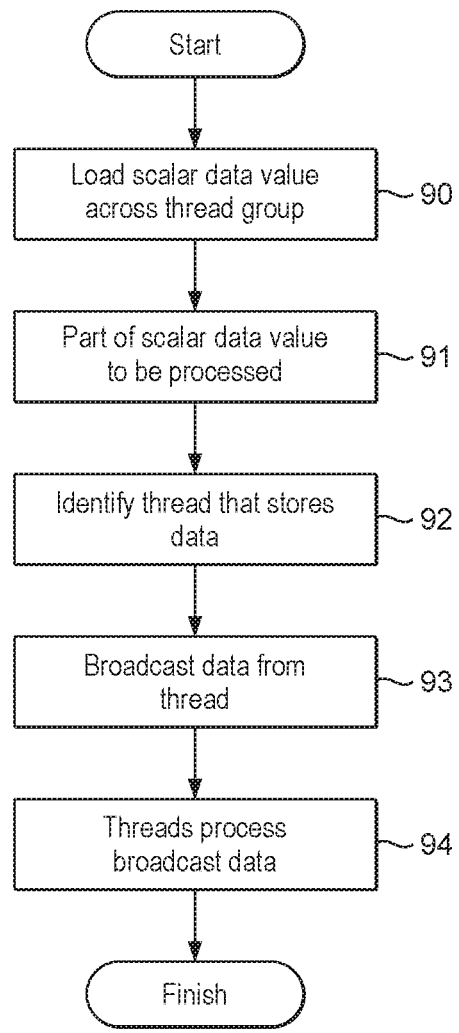
FIG. 8 is a flowchart showing the operation in an embodiment of the technology described herein.

FIG. 8 is a flow chart showing an embodiment of the above operation.

As shown in FIG. 8, during program execution, the programmable execution unit will execute a thread group wide load operation to store portions of a common, scalar data value across the registers of a plurality of threads of a thread group (as discussed above) (step 90).

Then, sometime later, at least part of that common, scalar data value will fall to be processed, e.g. as an input operand for a later instruction being executed. To do this, the programmable execution unit will operate (as discussed above) to broadcast a portion of the common, input scalar data value from one thread to all the threads in the thread group.

For this operation, the amount and position of the part of the data from the common, scalar input value to be provided to all the threads of the thread group for processing will be specified (step 91), and that information then used to identify the thread, and the data stored by that thread, to be broadcast to the threads of the thread group (step 92).

The position of the part of the input data value to be broadcast may, e.g., be specified as an offset indicating the start position for that data in the overall common, scalar input data value.

Correspondingly, which thread of the thread group stores the required data may be identified by dividing the start position (e.g. offset into the data value) for the required data by the size of each portion of the common, scalar input data value stored by an individual thread.

Then, once the thread which stores the required data has been identified, the start position within the data value portion stored by the identified thread for the data to be provided to the other threads is determined, e.g., again as an offset into the portion of the data value stored by the thread in question.

The required amount of data starting from the determined offset from the thread in question is then broadcast to all of the threads in the thread group (including the thread that stores the data) (step 93).

Once the threads have received the relevant part of the common, scalar, input data value, they will process that data as required, e.g. by using it as an input (operand) when executing an instruction in the program (step 94).

In the present embodiments, the operation in the manner of the present embodiments to store a common, scalar data value in a distributed fashion across registers of plural threads of a thread group, and to then broadcast appropriate portions of the common, scalar data value from one thread to all the threads in the thread group for use is configured and triggered by the compiler for the graphics processor (the shader compiler) configuring the relevant shader program execution so as to trigger that operation.

(An application 2 requiring graphics processing will provide shader programs implemented using a high-level shader programming language, such as GLSL, HLSL, OpenCL, etc. These shader programs are then translated by a shader language compiler to binary code for the target graphics processing pipeline 3. This may include the creation of one or more intermediate representations of the program within the compiler. The compiler 6 may, e.g., be part of the driver 4, with there being a special API call to cause the compiler to run. The compiler execution can thus be seen as being part of the draw call preparation done by the driver in response to API calls generated by an application. (Other compiler arrangements would, of course, be possible.)

Figure 9:
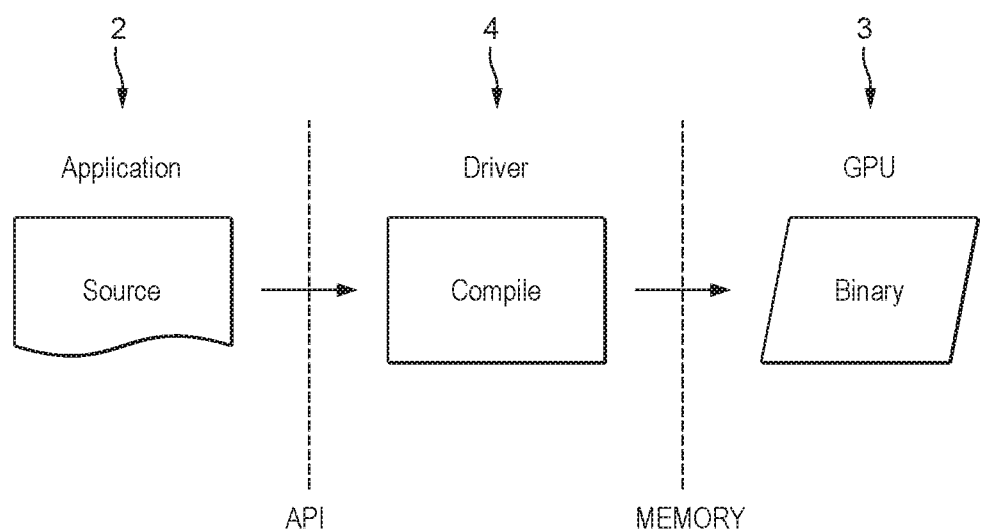
FIG. 9 illustrates shader program compilation.

FIG. 9 illustrates this, and shows a shader program being provided in the high level shader programming language by an application 2 to the driver 4, which then compiles the shader program to the binary code for the graphics processor 3.)

Figure 10:
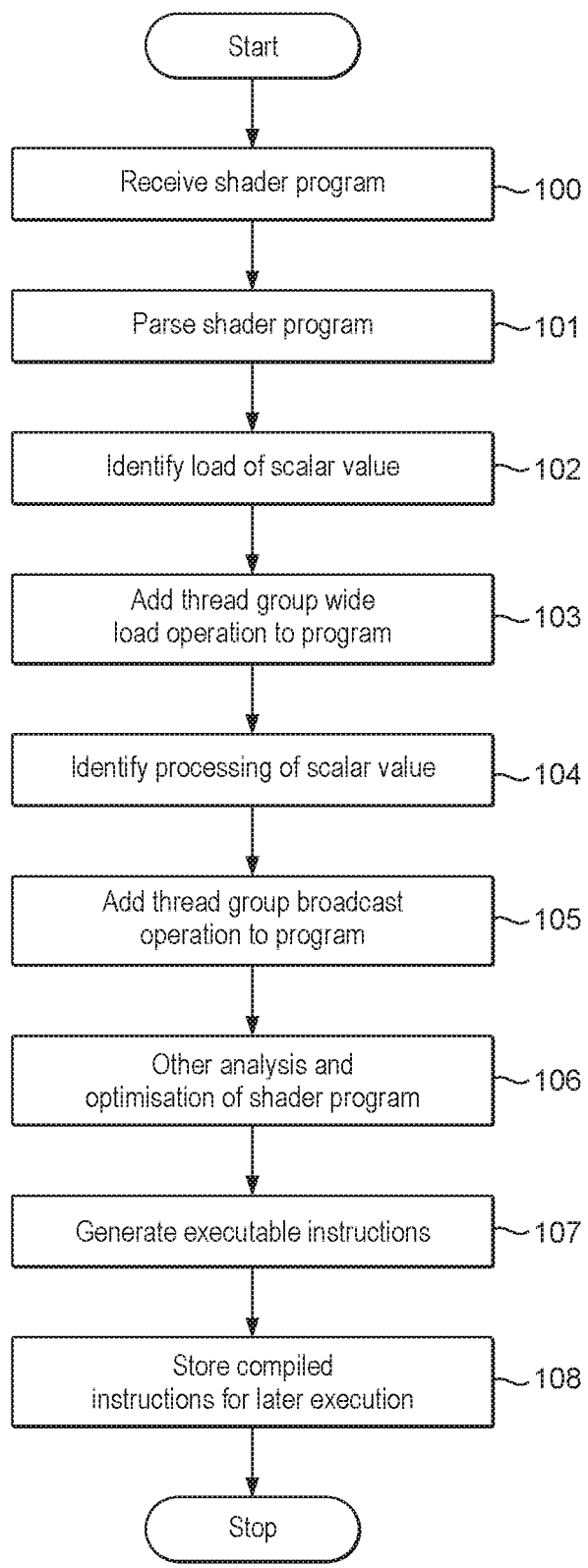
FIG. 10 is a flowchart showing shader program compilation in an embodiment of the technology described herein.

FIG. 10 shows an embodiment of the compiler operation in this regard.

As shown in FIG. 10, the compiler will receive a shader program to be executed, e.g. in an appropriate high level shader language, from the application that requires the graphics processing (step 100).

The compiler will then parse the shader program (step 101), and as part of that operation, identify the presence of input data values that will be the same for all the threads in a thread group when executing the shader program (step 102). Such common, scalar data values can be identified by the compiler in any suitable and desired manner.

When a common, scalar input data value is identified, then the compiler includes in the compiled shader program, an appropriate thread group-wide load instruction that will load the relevant portions of the common, scalar input value to the registers of different threads in the thread group (as discussed above), such that the common, scalar input value will be stored in a distributed fashion across the threads of the thread group (step 103).

This will be done for each common, scalar input value that is identified in the shader program.

Correspondingly, the compiler will also identify when a common, scalar input value falls to be processed by the threads of the thread group (step 104). Again, this can be done in any appropriate and desired manner.

Where it has been identified that the threads of the thread group are to process some or all of a common, scalar input data value, then the compiler will include an appropriate thread group-wide broadcast instruction in the compiled shader program to trigger the broadcast of the relevant part or parts of the common, scalar input data value to all the threads in the thread group for processing (step 105).

The compiler may otherwise optimise and compile the shader program in any suitable and desired manner (step 106), e.g. in the normal manner for the graphics processor and graphics processing system in question.

The compiler will then generate executable instructions for providing to the graphics processor to execute the shader program (step 107), which compiled shader program instructions are then stored for later execution (for issuing to the graphics processor 3 for execution) (step 108).

As discussed above, in the present embodiments the compiler operation will include identifying the presence and loading of common, scalar data values, together with the processing of such values, when executing the shader program. This can be achieved in any suitable and desired manner.

In one embodiment, the operation in the manner of the present embodiments is exposed to applications (to an application programmer (to the API)), such that applications can indicate to the compiler a requirement for operation in the manner of the present embodiments (that the compiler can then recognise when compiling a shader program), by defining a set of functions to provide an abstract interface to applications to load and read from scalar data, namely a function for reading the data from memory into a thread group wide register and a function for broadcasting data from the register of one thread to all threads in the thread group.

An application will then be able to indicate, e.g. via an appropriate function call, that such operation is required, with the compiler then identifying such a function call and configuring the program execution on the data processor accordingly.

The function for reading data from memory into a thread group is configured to:
Accept the location of the data to load, and the size of data to load, e.g. a BASE ADDRESS denoting the base location, and a TOTAL_SIZE denoting the size to load.
Decide on how much data to load per thread (BYTES_PER_THREAD in bytes) as the TOTAL_SIZE divided by the number of threads allowed per LOAD operation.
Fetch the ID of the thread (THREAD ID) within the thread group and
Issue a thread group wide LOAD instruction, where each thread loads BYTES_PER_THREAD data from BASE ADDRESS (BYTES_PER_THREAD*THREAD ID).

The function for broadcasting data from the register file of one thread to all threads is configured to:
Accept the value returned by the function for reading the data from memory into a thread group (TG_WIDE_VALUE denoting the value returned by the function for reading the data from memory into a thread group), the size of the data to broadcast (SIZE_TO_BROADCAST (in bytes)), and the offset into the data value to broadcast (OFFSET (in bytes).)
Find out how much data was loaded per thread (BYTES_PER_THREAD (in bytes)). (This mirrors point 2 from the above load function.)
Find out which thread contains the data to be broadcast: TARGET_THREAD_ID=OFFSET/BYTES_PER_THREAD.
Find out the offset into that thread's data to broadcast: THREAD_OFFSET=OFFSET % BYTES_PER_THREAD
Broadcast the SIZE_TO_BROADCAST bytes from TG_WIDE_VALUE, offset by THREAD_OFFSET for thread TARGET_THREAD_ID to all lanes (threads).

The compiler could also or instead, itself operate to identify the presence of common, scalar input data values (and their use) in a shader program, using appropriate compiler inference techniques, without there being (or the need for) any explicit indication that that operation is required from the application.

In this case, the compiler can infer that an input data value will be a common, "scalar" input data value for a group of threads in any suitable and desired manner, for example based on whether the input data value is first loaded from the same, fixed memory location by each thread, or whether the input data value is the result of a cross-lane operation that results in the same value in each thread (such as a minimum or maximum operation).

Then, in the case where a common, scalar input data value is identified by the compiler, the compiler can configure the program execution to load that data value using a group wide load operation and instruction (as discussed above), and to perform any reads from that data value by using a cross-lane broadcast operation and instructions in the program as appropriate).

It would also be possible in this regard for the application (programmer) to be able to indicate (declare) an intention that a variable in a program should be considered to be scalar (e.g. by defining a portion of memory as being "scalar"), as a hint to the compiler to operate in this manner. In this case, the compiler would, based on the declaration (hint) attempt to verify that the variable in question is scalar, and if that can be verified, then operate in the above manner (or if not, perform some other operation, e.g., error with a suitable message).

In the present embodiments, the operation in the above manner is constrained to only be permitted in the case where all threads in the thread group are (guaranteed to be) active (e.g. none of them have been terminated or masked off due to divergence) at the point where the common, scalar input data value operations are to be performed. The compiler operates to verify this at runtime, and if this condition is met, the appropriate program is issued to the graphics processor for execution. On the other hand, when it cannot be verified that all the threads in the thread group will be active at the appropriate time, then in an embodiment a default operation in which each thread stores and uses its own copy of the common, scalar input data value, is used instead.

It would be possible for the compiler to attempt to re-order operations in a program to ensure that all threads remain active for reads to the scalar data, where it is possible to do that.

For example, for the instruction sequence:

```
1 scalarData = ...
2 if (some per-thread condition) {
3   foo = scalarData.element0
4 }
``` it is not guaranteed that all threads would be active for the read to "scalarData".

However, the compiler could attempt to lift the load in the assignment to 'foo' ahead of the 'if' block to try to ensure that.

Although the above operation of the present embodiments has been described primarily with reference to the handling of a given, single, scalar input data value, it will be appreciated that there may be more than one common data value during execution of a given program, and that plural common, scalar input data values may exist and be being used simultaneously, and/or one after the other.

Equally, registers associated with the threads of a thread group may alternate between being used for storing (portions of) common, scalar input data values, and other (vector) data values during and over the execution of a program, as appropriate and as desired. It would also correspondingly be possible for there to be plural, common scalar data values being stored in a distributed fashion across the threads of a thread group at the same time where that is required or appropriate for the program execution.

It can be seen from the above that the technology described herein, in embodiments at least, provides a more efficient way for the handling of data values that are the same across all the threads of a thread group. This is achieved, in embodiments of the technology described herein at least, by storing such common data values in a distributed fashion across plural threads of a thread group, and then providing portions from the data value to the threads of the thread group when required.

The foregoing detailed description has been presented for the purposes of illustration and description. It is not intended to be exhaustive or to limit the technology to the precise form disclosed. Many modifications and variations are possible in light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processor that includes a programmable execution unit operable to execute programs to perform data processing operations and in which execution threads executing a program to perform data processing operations may be grouped together into thread groups in which the plural threads of a thread group each execute a program together, with each execution thread in a thread group executing a program having an associated set of one or more registers for storing data for the execution thread while executing the program;

the method comprising:
when the threads of a thread group executing a program are all to process a same, common input data value when executing the program:
storing different portions of the common input data value to be processed by the threads of the thread group into respective registers of different threads of the group of threads, such that the common input data value is stored in a distributed fashion across registers of plural different threads of the thread group;

the method further comprising:
when a thread of the group of threads is to process the common input data value when executing the program:
based on the requirements of the thread, providing some or all of a portion of the common input data value to be processed by the thread that is not stored in a register associated with the thread to the thread from the register of another thread in the thread group that stores the portion of the common input data value that the thread is to process; and
the thread processing the some or all of the portion of the common input data value provided from the register of the another thread in the thread group.

2. The method of claim 1, wherein the data processor is a graphics processor.

3. The method of claim 1, wherein only some but not all of the threads in the thread group store a portion of the common input data value, but the same number of registers from each thread in the thread group is allocated for storing a portion of a common input data value.

4. The method of claim 1, wherein the common input data value is distributed into portions across the number of threads that can load data in a single thread group wide load operation.

5. The method of claim 1, wherein the particular portion of the input data value to be stored by a given thread is determined based on an offset into the input data value based on the position of the thread within the thread group.

6. The method of claim 1, wherein data from a portion of the common input data value is provided from one thread to other threads in the thread group using a cross-lane broadcast operation that broadcasts data from a single thread to other threads in the thread group.

7. The method of claim 1, wherein the step of providing some or all of a portion of the common input data value stored by one thread to another thread or threads of the thread group comprises:
first determining which thread of the thread group stores the required portion of the common, input data value; and
then broadcasting some or all of the portion of the common input data value stored by that identified thread to one or more of the other threads in the thread group.

8. The method of claim 1, wherein an application that requires data processing by the data processor can indicate when the threads of a thread group executing a program are all to process a same, common input data value when executing the program.

9. The method of claim 1, wherein a compiler that compiles programs for execution by the data processor identifies when the threads of a thread group executing a program are all to process a same, common input data value when executing the program.

10. The method of claim 1, further comprising:
determining whether all threads in the thread group are guaranteed to be active when the threads of the thread group are all to process the same, common input data value when executing the program; and
when it cannot be verified that all the threads in the thread group are guaranteed to be active when the threads of the thread group are all to process the same, common input data value when executing the program, storing a separate copy of the common input data value for each thread instead.

11. A data processor, the data processor comprising:
a programmable execution unit operable to execute programs for execution threads to perform data processing operations and in which execution threads executing a program to perform data processing operations may be grouped together into thread groups in which the plural threads of a thread group each execute a program together;
a plurality of registers for storing data for execution threads executing a program, each execution thread of a thread group, when executing a program, having an associated set of registers of the plurality of registers for storing data for the execution thread;
the data processor further comprising:
a processing circuit configured to:
when the threads of a thread group executing a program are all to process a same, common input data value when executing the program:
store different portions of the common input data value to be processed by the threads of the thread group into respective registers of different threads of the group of threads, such that the common input data value is stored in a distributed fashion across registers of plural different threads of the thread group; and
when a thread of the group of threads is to process the common input data value when executing the program: based on the requirements of the thread, provide some or all of a portion of the common input data value to be processed by the thread that is not stored in a register associated with the thread to the thread from the register of another thread in the thread group that stores the portion of the common input data value that the thread is to process, such that the thread may then process the some or all of the portion of the common input data value provided from the register of the another thread in the thread group.

12. The data processor of claim 11, wherein the data processor is a graphics processor.

13. The data processor of claim 11, wherein only some but not all of the threads in the thread group store a portion of the common input data value, but the same number of registers from each thread in the thread group is allocated for storing a portion of a common input data value.

14. The data processor of claim 11, wherein the common input data value is distributed into portions across the number of threads that can load data in a single thread group wide load operation.

15. The data processor of claim 11, wherein the particular portion of the input data value to be stored by a given thread is determined based on an offset into the input data value based on the position of the thread within the thread group.

16. The data processor of any one of claim 11, wherein data from a portion of the common input data value is provided from one thread to other threads in the thread group using a cross-lane broadcast operation that broadcasts data from a single thread to other threads in the thread group.

17. The data processor of claim 11, wherein the processing circuit is configured to provide some or all of a portion of the common input data value stored by one thread to another thread or threads of the thread group by:
first determining which thread of the thread group stores the required portion of the common, input data value; and
then broadcasting some or all of the portion of the common input data value stored by that identified thread to one or more of the other threads in the thread group.

18. A data processing system comprising:
a data processor, the data processor comprising:
a programmable execution unit operable to execute programs for execution threads to perform data processing operations and in which execution threads executing a program to perform data processing operations may be grouped together into thread groups in which the plural threads of a thread group each execute a program together;
a plurality of registers for storing data for execution threads executing a program, each execution thread of a thread group, when executing a program, having an associated set of registers of the plurality of registers for storing data for the execution thread;
the data processor further comprising:
a processing circuit configured to:
when the threads of a thread group executing a program are all to process a same, common input data value when executing the program:
store different portions of the common input data value to be processed by the threads of the thread group into respective registers of different threads of the group of threads, such that the common input data value is stored in a distributed fashion across registers of plural different threads of the thread group; and when a thread of the group of threads is to process the common input data value when executing the program:
based on the requirements of the thread, provide some or all of a portion of the common input data value to be processed by the thread that is not stored in a register associated with the thread to the thread from the register of another thread in the thread group that stores the portion of the common input data value that the thread is to process, such that the thread may then process the some or all of the portion of the common input data value provided from the register of the another thread in the thread group; and a host processor;

wherein:

an application executing on the host processor that requires data processing by the data processor can indicate when the threads of a thread group executing a program are all to process a same, common input data value when executing the program.

19. The data processing system of claim 18, wherein a compiler that compiles programs for execution by the data processor executing on the host processor can identify when the threads of a thread group executing a program are all to process a same, common input data value when executing the program.

20. The data processing system of claim 18, further comprising a processing circuit configured to:
determine whether all threads in a thread group are guaranteed to be active when the threads of the thread group are all to process the same, common input data value when executing a program; and
when it cannot be verified that all the threads in the thread group are guaranteed to be active when the threads of the thread group are all to process the same, common input data value when executing the program, cause a separate copy of the common input data value to be stored for each thread instead.

21. A non-transitory computer readable storage medium storing computer software code which when executing on a processor performs a method of operating a data processor that includes a programmable execution unit operable to execute programs to perform data processing operations and in which execution threads executing a program to perform data processing operations may be grouped together into thread groups in which the plural threads of a thread group each execute a program together, with each execution thread in a thread group executing a program having an associated set of one or more registers for storing data for the execution thread while executing the program;

the method comprising:

when the threads of a thread group executing a program are all to process a same, common input data value when executing the program:
storing different portions of the common input data value to be processed by the threads of the thread group into respective registers of different threads of the group of threads, such that the common input data value is stored in a distributed fashion across registers of plural different threads of the thread group;

the method further comprising:

when a thread of the group of threads is to process the common input data value when executing the program:
based on the requirements of the thread, providing some or all of a portion of the common input data value to be processed by the thread that is not stored in a register associated with the thread to the thread from the register of another thread in the thread group that stores the portion of the common input data value that the thread is to process; and
the thread processing the some or all of the portion of the common input data value provided from the register of the another thread in the thread group.

\* \* \* \* \*